Dec. 6, 1960 — R. F. BASKIN ET AL — 2,963,648
PHASE DETECTOR
Filed June 13, 1957 — 3 Sheets-Sheet 1

Inventors
ROBERT F. BASKIN
LEONARD J. GILBERT
VINCENT R. LALLI
ROBERT M. ULMER by Hill, Sherman, Meroni, Gross & Simpson  Attys Dec. 6, 1960                R. F. BASKIN ET AL                2,963,648
                              PHASE DETECTOR
Filed June 13, 1957                                    3 Sheets-Sheet 2

*Inventors*
ROBERT F. BASKIN
LEONARD J. GILBERT
VINCENT R. LALLI
ROBERT M. ULMER by Hill, Sherman, Meroni, Gross & Simpson Attys Dec. 6, 1960 R. F. BASKIN ET AL 2,963,648
PHASE DETECTOR
Filed June 13, 1957 3 Sheets-Sheet 3

*Inventors*
ROBERT F. BASKIN
LEONARD J. GILBERT
VINCENT R. LALLI
ROBERT M. ULMER by *Hill, Sherman, Meroni, Gross & Simpson* Attys

United States Patent Office 2,963,648
Patented Dec. 6, 1960

2,963,648

PHASE DETECTOR

Robert F. Baskin, South Euclid, Leonard J. Gilbert, Cleveland, Vincent R. Lalli, Sagamore Hills Township, and Robert M. Ulmer, Beachwood, Ohio, assignors to Thompson Ramo Wooldridge Inc., a corporation of Ohio Filed June 13, 1957, Ser. No. 665,526

2 Claims. (Cl. 324—83)

This invention relates to a phase detector and it is the primary object of the invention to provide a circuit for producing an output current or voltage which is a linear function of phase difference between two input signals over a range of substantially 360°, or plus or minus 180 electrical degrees.

Another object of the invention is to provide a phase detector in which the relation of output voltage to phase difference can be readily adjusted to suit any requirements.

A further object of the invention is to provide a phase detector in which load variations over a considerable range do not affect circuit operation.

Still another object of the invention is to provide a phase detector having circuits which are extremely rapid in response so as to be operative to compare the phase of high frequency signals.

A still further object of the invention is to provide a phase detector which is simple, compact and readily constructed from a minimum number of component parts and yet is stable, reliable and trouble-free in operation, despite extremes of temperature, shocks, accelerations and vibrations.

According to this invention, a bistable circuit is utilized which circuit is arranged to produce a certain voltage output in one condition of equilibrium and a different voltage output in a second condition of equilibrium. This circuit is used to compare the phase of two pulse signals, square waves or waveforms (which can be converted to these types) of the same or similar frequencies. One of the pulse signals is applied in a manner to obtain one condition of equilibrium in response to each pulse thereof and the other signal is applied in a manner to obtain the other condition of equilibrium in response to each pulse thereof. The output of the bistable circuit is applied to averaging means responsive to the average voltage or current output of the circuit.

As will be explained in more detail hereinafter, this arrangement will produce a linear relation between output voltage or current and phase difference over a range of substantially 360°.

The bistable circuit may comprise a pair of relay devices, preferably transistors, with the output of each device being coupled to the input of the other, so that when one device conducts the other will be in a substantially non-conducting state. This circuit is very stable in operation and by properly combining output signals from the two devices, the circuit will provide a linear relation between output circuit or voltage and phase difference over a range of substantially 360°. Also, by adjustment of the operation of the two devices, the relation of output voltage to phase difference can be readily adjusted to suit any requirements.

Further features of the invention reside in the provision of means whereby variations in load do not effect circuit operation and means whereby extremely rapid responses are obtained. Through the use of transistors and other features, the phase detector of this invention is very stable, reliable and trouble-free in operation.

This invention contemplates other objects, features and advantages which will become more fully apparent from the following detailed description taken in conjunction with the accompanying drawings which illustrate preferred embodiments and in which.

Figure 1:
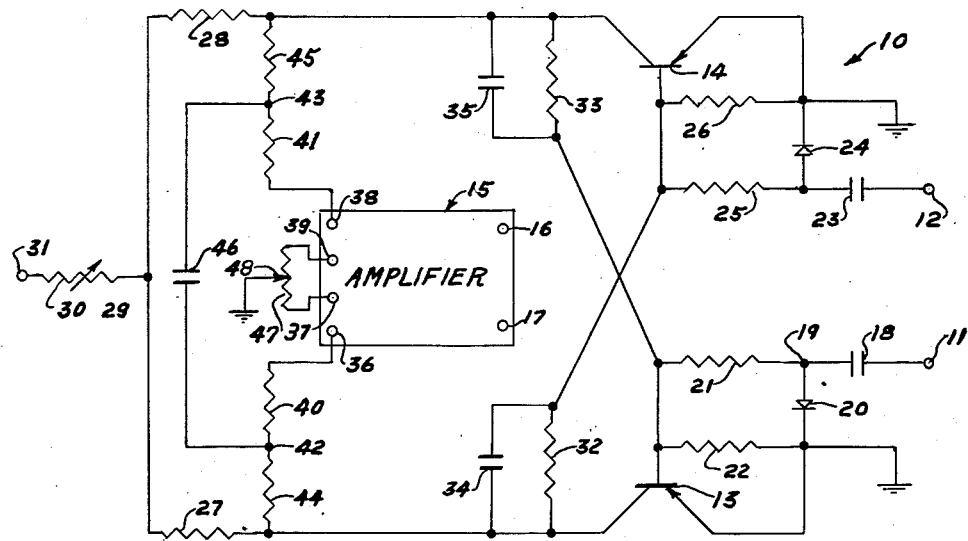
Figure 1 is a schematic circuit diagram of one preferred form of phase detector constructed according to the principles of this invention.

Reference 10 generally designates one preferred form of phase detector circuit. In general, the circuit 10 comprises a pair of input terminals 11 and 12 arranged to be connected to sources of pulses or square waves of the same frequency; a bistable circuit including a pair of transistors 13 and 14; and an amplifier 15 connected to the bistable circuit and having a pair of output terminals 16 and 17. The circuit functions to produce an output of voltage at the terminals 16, 17 which is a linear function of the phase difference of the signals applied to the input terminals 11 and 12 over the range of substantially 360°.

The input terminal 11 is connected through a coupling capacitor 18 to a circuit point 19 which is connected through a diode 20 to ground.

The signal applied to the input terminal 11 consists of squares waves or positive and negative pulses or negative pulses and the diode 20 functions to limit the passage of positive pulses whether from the input or differentiated from the incoming square wave by the circuit. The circuit point 19 is connected through a resistor 21 to the base of the transistor 13, the base being connected through a resistor 22 to ground and the emitter of the transistor 13 being connected directly to ground.

The resistor 22 thus serves as a base resistor across which the input switching pulse is developed, and is also a part of the biasing circuit for the base of the transistor 13. The resistor 21 serves to isolate the input pulse source from the switching circuit and also acts as a voltage divider for the incoming pulses along with the base resistor 22.

The circuit arrangement between the input terminal 12 and the transistor 14 is identical to that between the terminal 11 and the transistor 13, and comprises a capacitor 23, a diode 24, and resistors 25 and 26, which respectively correspond to the capacitor 18, diode 20, and resistors 21 and 22.

The collectors of the transistors 13 and 14 are respectively connected through resistors 27 and 28 to a circuit point 29 which is connected through a rheostat 30 to a terminal 31 which is connected to a suitable power supply at a point at a negative potential relative to ground. It may be here noted that the transistors 13 and 14 are type pnp transistors, but type npn transistors could be used with a positive supply.

To provide the bistable operation, the collector of the transistor 13 is connected through a resistor 32 to the base of the transistor 14, and the collector of the transistor 14 is similarly connected through a resistor 33 to the base of the transistor 13. Thus when the transistor 13 conducts, the potential of the collector will move toward ground potential to reduce the potential difference between the base and emitter of the transistor 14, to thus reduce current flow through the transistor 14 to zero or a small value. The collector of the transistor 14 will then be at a higher negative potential to increase the negative potential of the base of the transistor 13 and increase conduction through the transistor 13. The transistor 13 will therefore remain stably in a conducting state, until a switching pulse is applied to cause the transistor 14 to conduct after which the transistor 14 will remain stably in a conducting state.

In order to improve the speed of operation of the circuit, a pair of capacitors 34 and 35 are respectively connected across the resistors 32 and 33. By virtue of the direct coupling between the transistors, and the use of the capacitors 34 and 35, extremely rapid switching operation is achieved, and the circuit can be used to measure the relative phases of high frequency signals.

The amplifier 15 is preferably of a type having a pair of opposed input circuits respectively having terminals 36 and 37 and terminals 38 and 39. The terminals 36 and 38 are respectively connected through resistors 40 and 41 to circuit points 42 and 43 which are connected through resistors 44 and 45 to the collectors of the transistors 13 and 14. A capacitor 46 is connected between the circuit points 42 and 43, and cooperates with the resistors 40, 41, 44 and 45 to define filter circuits which decouple the bistable circuit and the amplifier, and prevents the operation of the bistable circuit from being affected by changes in the load presented by the amplifier.

The input terminals 37 and 39 of the amplifier 15 are connected to opposite ends of the potentiometer 47 having a movable contact 48 connected to ground.

The operation will now be described with reference to Figure 2 which is a graphical illustration of the voltages at certain points with respect to time.

Figure 2:
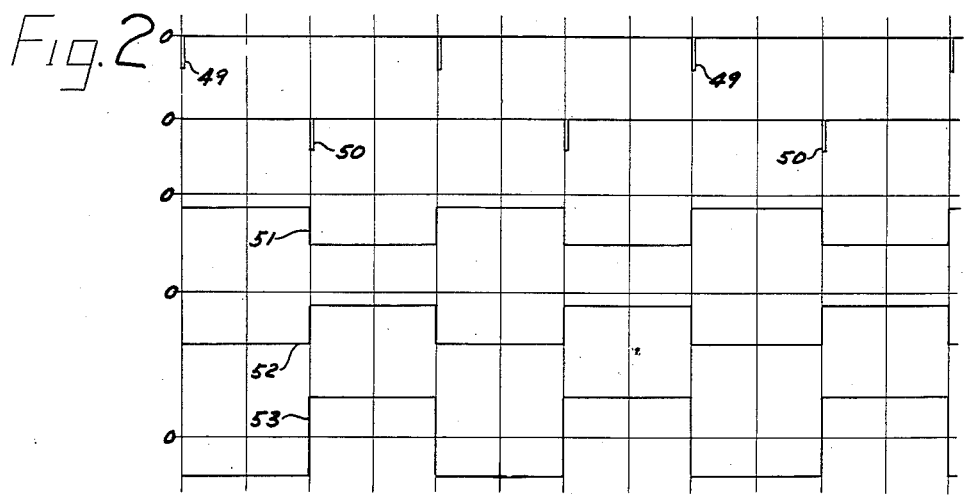
Figure 2 is a graph in which the wave forms of the signals at certain points are plotted against time, to illustrate the operation of the phase detector.

As shown in Figure 2, the input signal applied to the terminal 11 comprises a series of negative pulses 49, and the input signal applied to the terminal 12 comprises a series of pulses 50, which may be 180° out of phase as illustrated in Figure 2. The input can also be alternate positive and negative pulses.

When an input pulse 49 is applied to the transistor 13, it will conduct to cause the potential of the collector thereof to move in a positive direction toward ground potential. At this time, the transistor 14 will switch to a non-conducting state and the potential of the collector thereof will be approximately equal to the potential of the circuit point 29. When an input pulse 50 is received at the terminal 12, the situation will be reversed with the transistor 14 rendered conductive and the transistor 13 non-conducting. The voltages of the collectors of the transistors 13 and 14 will accordingly be as indicated by references 51 and 52 in Figure 2.

The connection to the amplifier 15 is such that it will respond to the average of the differential between the voltages of the collectors of transistors 13 and 14. The amplifier 15 might also be current sensitive and respond to the average of the difference between the currents. This differential voltage is indicated by reference 53 in Figure 2, which is a plot of the voltage of the collector of the transistor 14 minus the voltage of the collector of the transistor 13. It will be observed that this differential voltage will be negative following a pulse 49 and positive following a pulse 50. With the pulses 49 and 50 being 180° out of the phase, the differential voltage will be negative for the same amount of time that it is positive, and the average voltage will be equal to zero.

Figure 3:
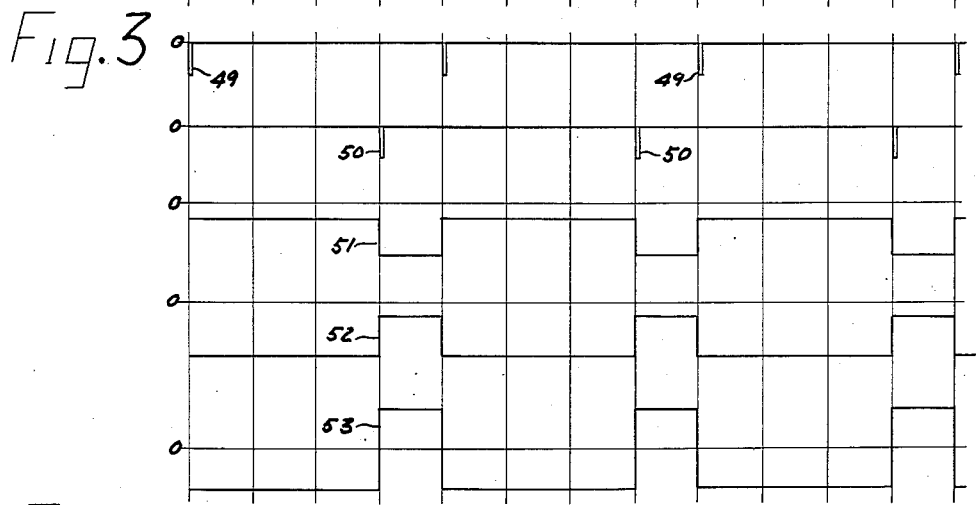
Figure 3 is a graph similar to Figure 2, illustrating the operation with a different phase relation between signals.

Figure 3 is a graph similar to Figure 2 but illustrating the operation with the pulses 50 lagging behind the pulse 49 by a phase difference of approximately 270°. With this phase relation, the differential voltage will be negative 75% of the time and positive only 25% of the time. Accordingly, the average of the differential voltage will have a substantial negative value.

It will be appreciated that if the phase of the signals is such that the pulses 50 lag behind the pulses 49 by phase difference of less than 180°, the average of the differential voltage will be positive, and it will become increasingly positive as the phase difference is decreased.

Figure 4:
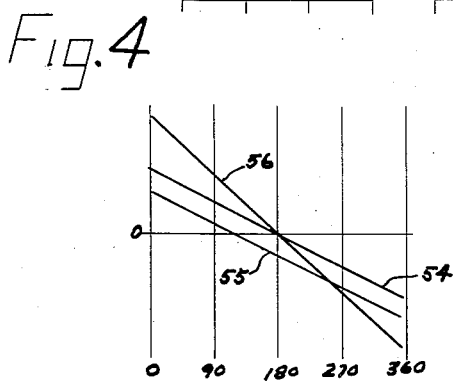
Figure 4 is a graph illustrating various relationships between output voltage and the relative phase of input signals.

Referring to Figure 4, reference 54 is a plot of the output voltage versus relative phase of the input signals. It will be observed that a straight line or linear relationship is obtained. The line 54 crosses the zero axis at a relative phase difference of 180°. In some circumstances, it may be desirable that the line cross the axis at some other phase difference, which may be readily achieved by adjustment of the balance potentiometer contact point 48, to obtain a relation as indicated by reference 55 in Figure 4, for example. An increase or decrease in the slope of the line can be readily obtained by adjustment of the gain rheostat 30 to obtain a relation such as indicated by reference 56 in Figure 4, for example.

It is possible that in some circumstances, a non-linear relationship may be desirable. In that event, a suitable non-linear characteristic may be introduced in the amplifier 15.

Figure 5:
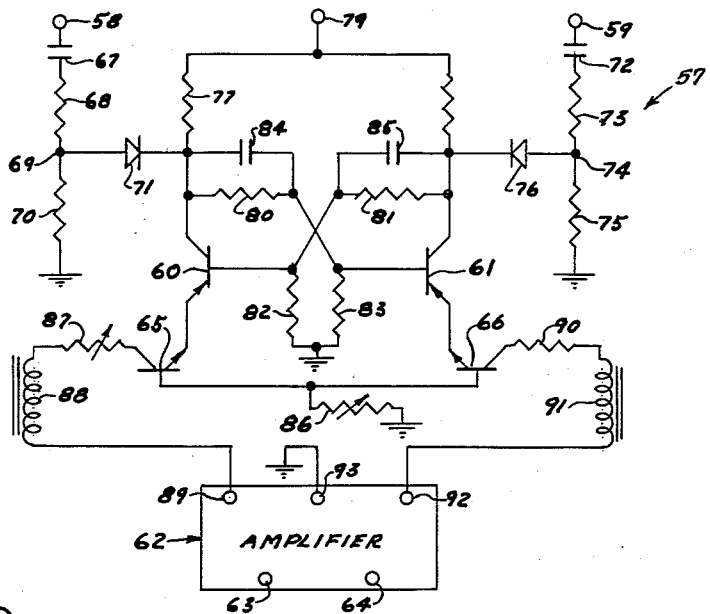
Figure 5 is a schematic circuit diagram of another form of phase detector constructed according to the principles of this invention.

Referring now to Figure 5, reference 57 generally designates another preferred circuit arrangement. This circuit is similar to that of Figure 1, and in general comprises a pair of input terminals 58 and 59 which may be connected to a pair of sources of pulse input signals; a bistable circuit including a pair of transistors 60 and 61; and an amplifier 62 responsive to the bistable circuit output and having a pair of output terminals 63 and 64. As in the case with the circuit of Figure 1, an output voltage is developed between the terminals 63 and 64 which is a linear function of the phase difference of the input pulses of a range of substantially 360°.

The circuit of Figure 5 differs from that of Figure 1 in that the pulse input signals are applied to the collectors of the transistors 60 and 61, and in that another pair of transistors 65 and 66 are connected between the bistable circuit and the amplifier to provide isolation therebetween.

The input terminal 58 is connected through a capacitor 67 and a resistor 68 to circuit point 69 which is connected through a resistor 70 to ground and also through a diode 71 to the collector of the transistor 60. The input terminal 59 is similarly connected through a capacitor 72 and a resistor 73 to a circuit point 74 which is connected through a resistor 75 to ground and also through a diode 76 to the collector of the transistor 61. The capacitors 67 and 72 serve as coupling capacitors for the pulses and provide direct current isolation. The resistors 68 and 73 serve to isolate the pulse sources from the switching circuits and act as voltage dividers along with the resistors 70 and 75. The diodes 71 and 76 serve to eliminate any chance of an incorrect polarity pulse affecting the circuit.

The collectors of the transistors 60 and 61 are respectively connected through resistors 77 and 78 to a power supply terminal 79 which should be at a negative potential relative to ground, the transistors 60 and 61 being type pnp transistors. The collectors of the transistors 60 and 61 are also connected through resistors 80 and 81 to the bases of the transistors 61 and 60, respectively, the bases of the transistors 60 and 61 being respectively connected to ground through resistors 82 and 83.

As will be described, the emitters of the transistors 60 and 61 are effectively coupled to ground. With this circuit, each of the transistors 60 and 61 will be rendered non-conductive when the other conducts. A negative pulse input at the input terminal 58 will cause the transistor 61 to conduct and similarly, a negative pulse input at the terminal 59 will cause the transistor 60 to conduct.

The emitters of the transistors 60 and 61 are respectively connected to the emitters of the transistors 65 and 66, the collectors of which are connected together and through a rheostat 86 to ground. The rheostat 86 serves as a gain adjustment device.

It should have been noted that capacitors 84 and 85 are respectively connected across the resistors 80 and 81 to obtain a rapid response, and permit operation at high frequencies.

The collector of the transistor 65 is connected through a rheostat 87 and a choke coil 88 to an input terminal 89 of the amplifier 62, and the collector of the transistor 66 is similarly connected through a resistor 90 and a choke coil 91 to an input terminal 92 of the amplifier 62. The terminals 89 and 92 are respectively connected to opposed inputs of the amplifier 62, and a neutral terminal 93 is connected to ground.

The amplifier 62 in this case is preferably a magnetic amplifier having a low input impedance, as compared with the usual electronic amplifier, and the choke coils 88 and 91 serve as filters to facilitate averaging of the differential of the signals from the bistable circuit, and also cooperate with the transistors 65 and 66 in isolating the bistable circuit and amplifier.

The rheostat 87 serves as a balance adjustment device, and may be adjusted to cause the output voltage line to cross the zero axis at any desired phase difference between input signals.

It should be noted that since the transistors 60 and 61 are type pnp transistors, the transistors 65 and 66 should be type npn transistors. The type of transistors may, of course, be changed; that is, transistors 60 and 61 may be type npn with type pnp for transistors 65 and 66.

Figure 6:
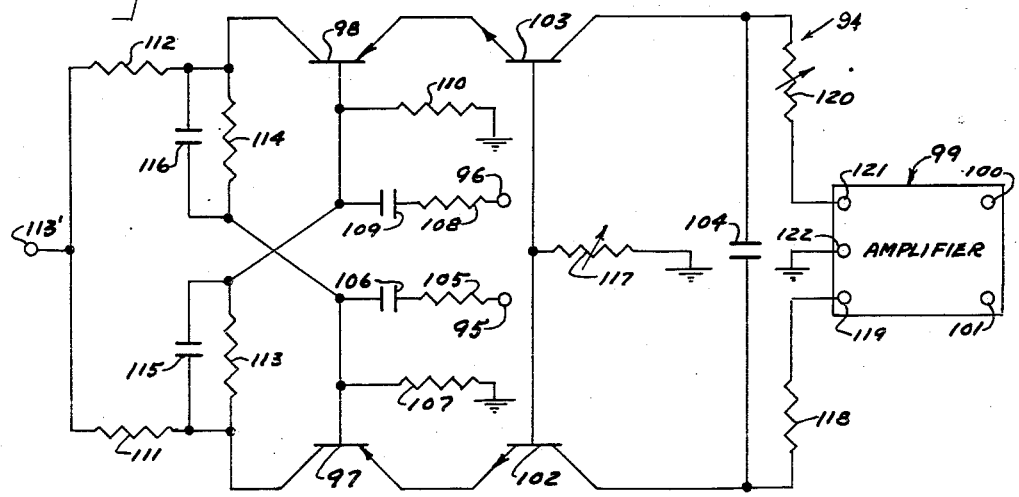
Figure 6 is a schematic circuit diagram of another preferred form of phase detector.

Referring now to Figure 6, reference numeral 94 generally designates another modified circuit arrangement. This arrangement is basically the same as those of Figures 1 and 5, and in general, comprises a pair of input terminals 95 and 96 arranged to be connected to a pair of pulse input signals; a bistable circuit including a pair of transistors 97 and 98; and an amplifier 99 having a pair of output terminals 100 nad 101, a voltage being developed across the output terminals 100 and 101, which is a linear function of the phase difference between the input signals, over a range of substantially 360°.

The circuit 94 is similar to the circuit 57 of Figure 5 in that a pair of type npn transistors 102 and 103 is provided between the bistable circuit and the amplifier for isolation purposes. This circuit differs, however, in that the input signals are applied to the bases of the transistors of the bistable circuit and in that a capacitor 104 is provided for filtering purposes in place of the choke coils of the circuit of Figure 5.

The input terminal 95 is connected through a resistor 105 and a capacitor 106 to the base of the transistor 97 which is connected through a resistor 107 to ground. The input terminal 96 is similarly connected through a resistor 108 and a capacitor 109 to the base of the transistor 98 which is connected through a resistor 110 to ground. The capacitors 106 and 109, of course, serve as coupling capacitors and provide direct current isolation. The resistors 105 and 108 also provide isolation and cooperate with the base resistors 107 and 110 to provide voltage dividers.

The collectors of the transistors 97 and 98 are respectively connected through resistors 111 and 112 to a terminal 113 which is connected to a power supply terminal at a negative potential relative to ground, the transistors 97 and 98 being type pnp transistors. The collector of the transistor 97 is also connected through a resistor 113 to the base of the transistor 98, and the collector of the transistor 98 is similarly connected through a resistor 114 to the base of the transistor 97. Capacitors 115 and 116 are connected across the resistors 113 and 114 to obtain rapid response of the circuit.

The emitters of the transistors 97 and 98 are respectively connected to the emitters of the transistors 102 and 103, and the bases of the transistors 102 and 103 are connected together and through a gain adjustment rheostat 117 to ground.

The collector of the transistor 102 is connected through a resistor 118 to an input terminal 119 of the amplifier 99, and the collector of the transistor 103 is connected through a balance adjustment rheostat 120 to an opposed input terminal 121 of the amplifier 99, the amplifier having a neutral terminal 122 connected to ground. The filter capacitor 104 is connected between the collectors of the transistors 102 and 103.

Figure 7:
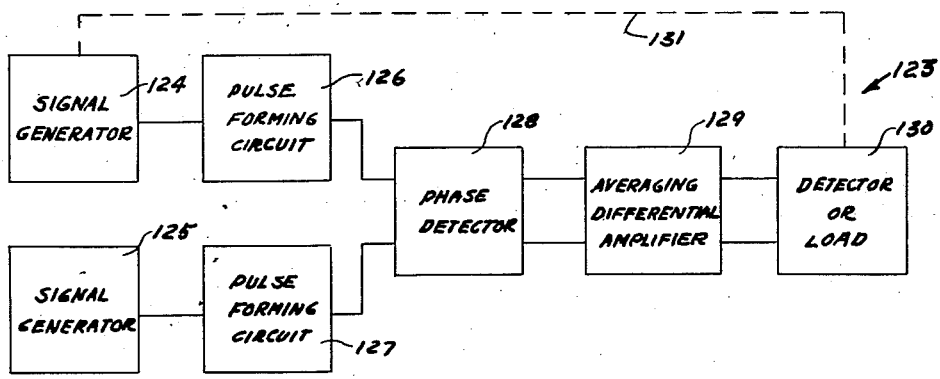
Figure 7 is a schematic block diagram of one preferred application of the phase detector of this invention.

Referring now to Figure 7, reference 123 generally designates one preferred application of the phase detectors of this invention. In this arrangement, a pair of signal generators 124 and 125 are respectively connected through pulse-forming circuits 126 and 127 to a phase detector 128 which may have one of the above-described circuits. The output of the phase detector 128 is applied to an averaging differential amplifier 129 and the output thereof is applied to a detector or load 130 of any suitable form. The load 130 may be simply in the form of a meter, or it may be in the form of a frequency control device coupled to the generator 124 as indicated by the dotted line 131, to maintain the phase of the generator 124 equal to that of the generator 125.

The pulse forming circuits 126 and 127 are not necessary if the outputs of the signal generators 124 and 125 are in the form of pulses. If the signal generators have sine wave outputs, each of the pulse forming circuits may comprise a clipping, limiting or Schmitt trigger circuit for squaring off the sine wave, a differentiating circuit for generating pulses from the square wave, and a rectifier for obtaining use of pulses of only one polarity.

It will be understood that the types of transistors can be changed if desired and it may be necessary to change the polarity of the input pulses if transistors of different types are used. It will also be apparent that although transistors are particularly advantageous in the circuits of this invention, it is possible to use tubes or other types of relay devices.

It will be understood that modifications and variations may be effected without departing from the spirit and scope of the novel concepts of this invention.

We claim as our invention:

1. In a phase detector for detecting the phase difference between a pair of pulse signals, a first pair of transistors, a first pair of impedances for connecting a first pair of like electrodes of said first pair of transistors to one terminal of a power supply, a second pair of impedances for connecting a second pair of like electrodes of said first pair of transistors to the other terminal of the power supply, a third pair of impedances cross-connecting said first and second pairs of like electrodes, means for applying the input signals to one of said pairs of electrodes, a second pair of transistors having input electrodes connected between one terminal of the power supply and a third pair of like electrodes of said first pair of transistors, and an output circuit connected to output electrodes of said second pair of transistors to respond to the current flow through one of said second pair of transistors minus the current flow through the other of said second pair of transistors.

2. In a phase detector for detecting the phase difference between a pair of pulse signals, a first pair of transistors, a first pair of impedances for connecting a first pair of like electrodes of said first pair of transistors to one terminal of a power supply, a second pair of impedances for connecting a second pair of like electrodes of said first pair of transistors to the other terminal of the power supply, a third pair of impedances cross-connecting said first and second pairs of like electrodes, means for applying the input signals to a pair of like electrodes of said first pair of transistors, a second pair of transistors having input electrodes connected to a pair of like electrodes of said first pair of transistors, an output circuit having a pair of terminals, and means including a pair of choke coils connecting output electrodes of said second pair of transistors to said pair of terminals of said output circuit.

References Cited in the file of this patent

UNITED STATES PATENTS

| | | |
|---|---|---|
| 2,513,477 | Gubin | July 4, 1950 |
| 2,513,528 | Sohon | July 4, 1950 |
| 2,522,976 | Williams | Sept. 19, 1950 |
| 2,718,613 | Harris | Sept. 20, 1955 |
| 2,757,286 | Wanlass | July 31, 1956 |
| 2,758,277 | Daspit | Aug. 7, 1956 |
| 2,776,420 | Woll | Jan. 1, 1957 |
| 2,838,675 | Wanlass | June 10, 1958 |
| 2,838,733 | Longfellow | June 10, 1958 |